(12) United States Patent
Simon et al.

(10) Patent No.: US 10,249,071 B2
(45) Date of Patent: Apr. 2, 2019

(54) USER INTERFACE WITH FAST VIEW TILES

(71) Applicant: SAP SE, Walldorf (DE)

(72) Inventors: Patrick Simon, Beckingen (DE); Franz-Dieter Berger, Saarbrücken (DE)

(73) Assignee: SAP SE, Walldorf (DE)

( * ) Notice: Subject to any disclaimer, the term of this patent is extended or adjusted under 35 U.S.C. 154(b) by 41 days.

(21) Appl. No.: 15/270,239

(22) Filed: Sep. 20, 2016

(65) Prior Publication Data
US 2018/0082452 A1    Mar. 22, 2018

(51) Int. Cl.
| | |
|---|---|
| G06F 17/22 | (2006.01) |
| G06T 11/60 | (2006.01) |
| G06T 11/40 | (2006.01) |
| G06T 11/00 | (2006.01) |
| G06Q 10/10 | (2012.01) |
| G06T 11/20 | (2006.01) |

(52) U.S. Cl.
CPC ............ G06T 11/60 (2013.01); G06F 17/227 (2013.01); G06F 17/2247 (2013.01); G06Q 10/10 (2013.01); G06T 11/001 (2013.01); G06T 11/206 (2013.01); G06T 11/40 (2013.01)

(58) Field of Classification Search
CPC .................................................. G06F 17/2247
USPC ......................................................... 715/236
See application file for complete search history.

(56) References Cited

U.S. PATENT DOCUMENTS

| | | | |
|---|---|---|---|
| 2013/0167001 A1* | 6/2013 | De Angelis ....... | G06F 17/30861 715/211 |
| 2015/0040052 A1* | 2/2015 | Noel ................... | G06F 3/04847 715/771 |
| 2015/0128074 A1* | 5/2015 | De Angelis ......... | G06F 3/04845 715/763 |
| 2015/0287227 A1* | 10/2015 | Reeves ................. | G06T 11/206 345/440 |
| 2016/0328871 A1* | 11/2016 | Chen ........................ | G06T 1/20 |

OTHER PUBLICATIONS

Schulze et al., CSS Masking Module Level 1, W3C, Aug. 26, 2014, p. 1-66, retrieved from https://www.w3.org/TR/cass-masking-1 (Year: 2014).*

Schulze et al., CSS Masking Module Level 1, W3C, Aug. 26, 2014, p. 1-66 (https://www.w3.org/TR/cass-masking-1) (Year: 2014).*

* cited by examiner

*Primary Examiner* — Frank D Mills
(74) *Attorney, Agent, or Firm* — Buckley, Maschoff & Talwalkar LLC

(57) ABSTRACT

Provided are devices and methods for generating a view tile for a user interface. In one example, the method may include generating a top image layer comprising a plurality of transparent segments which are capable of representing a plurality of values based on which of the plurality of transparent segments are filled in with a color, generating a background color layer including the color, and overlaying the top image layer on the background color layer to generate a view tile representing a value from among the plurality of values. The generated view tile may provide a quick overview of an item with only a glance without requiring the viewer to read information in detail allowing the viewer to provide their attention to other activities.

20 Claims, 8 Drawing Sheets
(6 of 8 Drawing Sheet(s) Filed in Color)

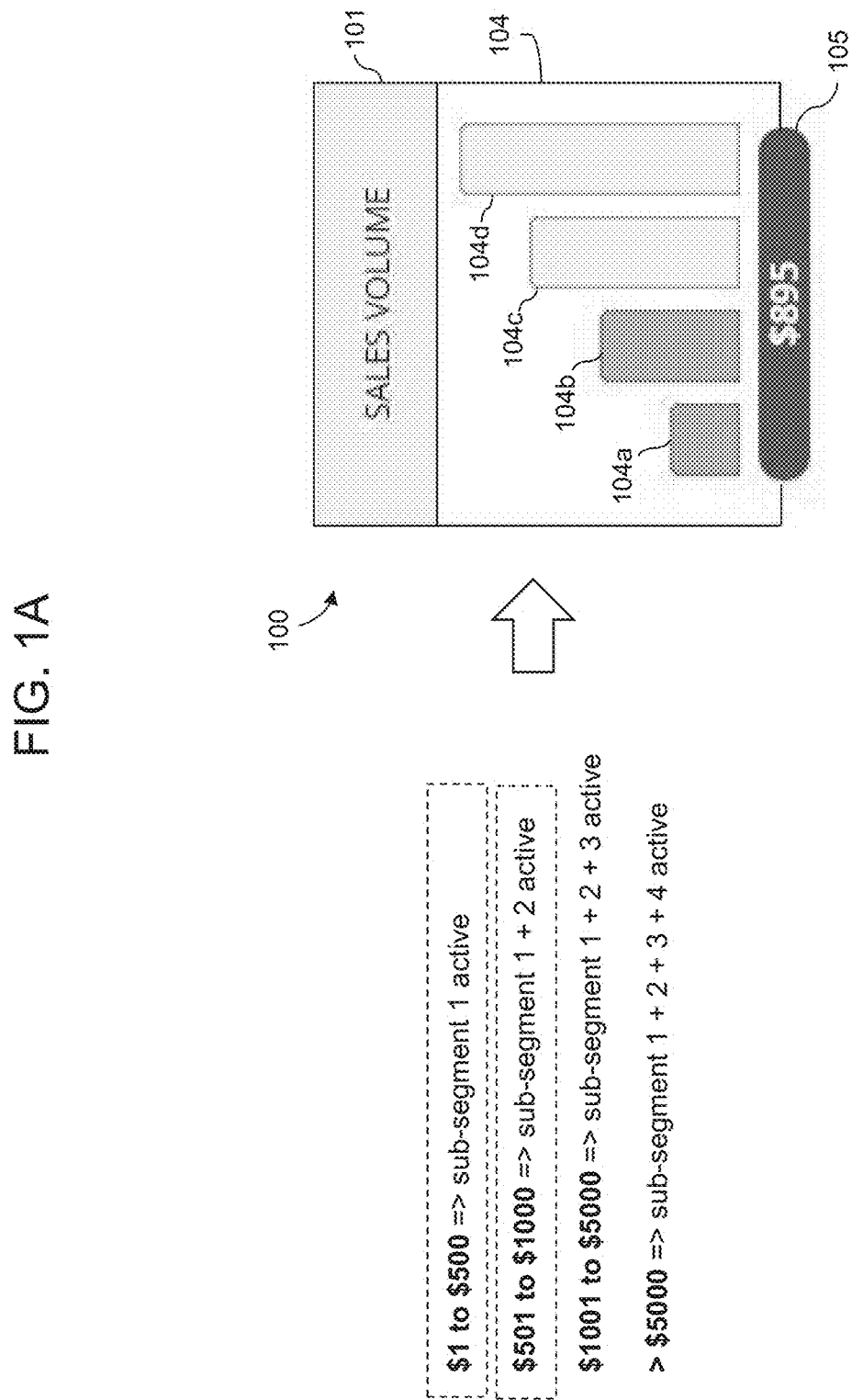

USER INTERFACE WITH FAST VIEW TILES

BACKGROUND

Many organizations and companies provide sales outlets and retail stores for selling products in addition to selling their products on the Internet. Customers often register their personal information with the company in order to receive better services, offers, discounts, and the like. In order to receive these benefits, customers need to identify themselves when entering a store by using a customer card, a discount card, or even providing their name and other identification information. In the future, it is likely that customers may be identified when they enter the store, for example, by a scanning system (e.g., camera), radio frequency identification (RFID) detection system, or the like. In all these cases a company can collect personal information about a customer, analyze the data, and provide this data as statistical data or buying patterns on a company web page accessible internally. For example, a sales consultant at a retail store can view a company website via a personal computer, a tablet, a mobile device, or the like, enter a customer's information, and advise an individual customer based on their respective data called from the company website. For example, if a customer has a history of buying items in a specific price range, the sales consultant can provide offers for other products in the same price range.

However, sales consultants operate in a fast-paced, high-pressure environment that demands they remain fully prepared for the latest opportunities and challenges in addition to being aware of purchasing interests about a customer they are approaching or in the midst of assisting. Recently, companies have begun using dashboards or user interfaces that may include a plurality of graphs, charts, spreadsheets, and the like, based on customer data. However, opening a company website and reading customer data from a website or even from a chart or graph can cause the sales consultant to become distracted and take away their attention from the customer. As a result, the sales consultant can fail to adequately assist a customer that is present in the store and ultimately lose the customer or fail to capitalize on the full purchasing interest of the customer. Therefore, what is needed is a way of keeping a salesperson informed of customer information when a customer is present in the store without requiring significant time and/or delay on the part of the salesperson.

BRIEF DESCRIPTION OF THE DRAWINGS

Features and advantages of the example embodiments, and the manner in which the same are accomplished, will become more readily apparent with reference to the following detailed description taken in conjunction with the accompanying drawings. The application file contains at least one drawing executed in color. Copies of this patent or patent application publication with color drawings will be provided by the Office upon request and payment of the necessary fee.

FIG. 1A is a diagram illustrating a view tile in accordance with an example embodiment.

Figure 1B:
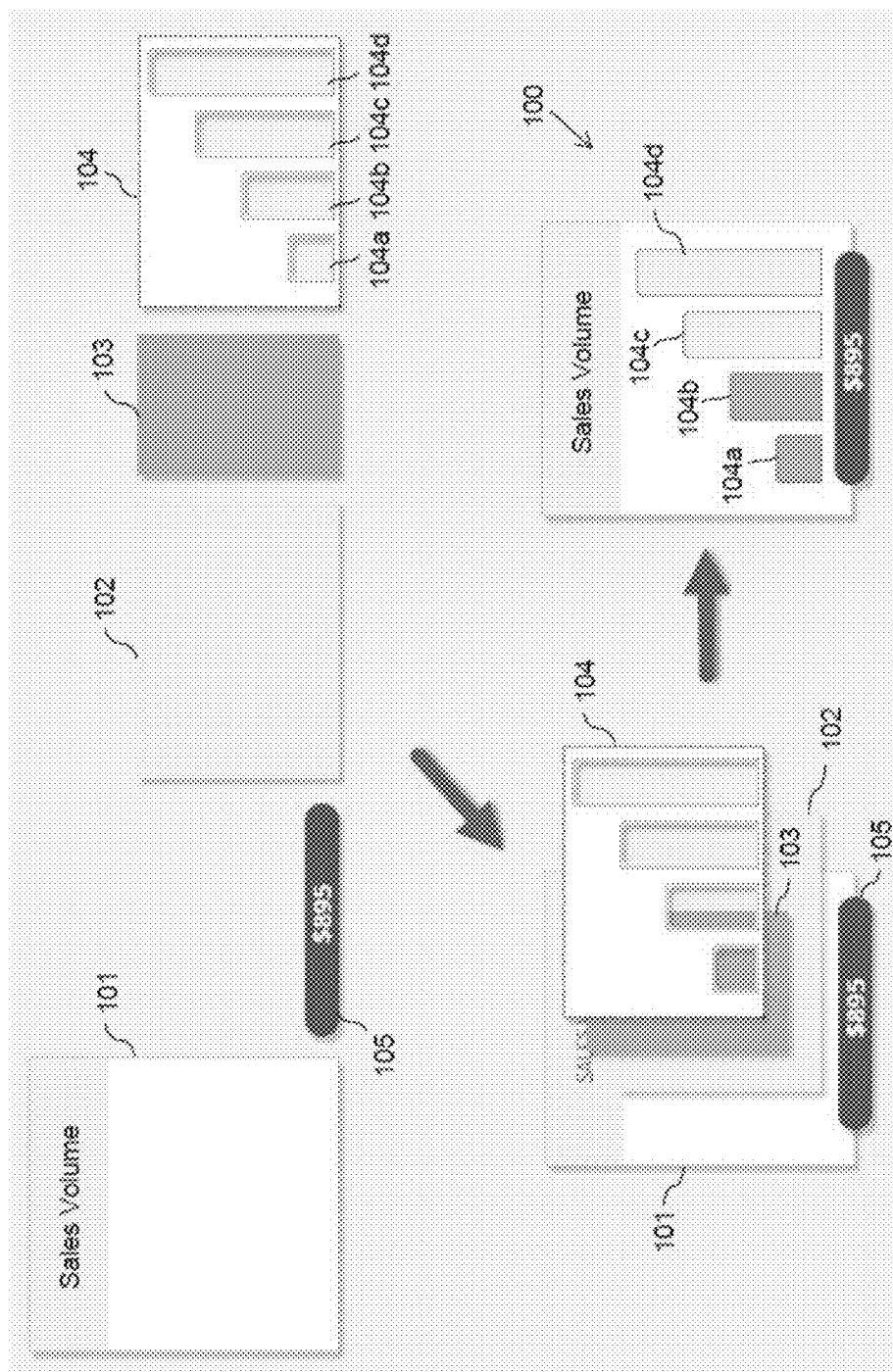
FIG. 1B is a diagram illustrating a plurality of layers that constitute the view tile shown in FIG. 1A, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments relate to generating and displaying one or more view tiles, also referred to as "fast view" tiles. In the examples provided, a view tile may have a shape of a square, a rectangle, a circle, a triangle, a pentagon, a hexagon, and octagon, or any other desired shape. Each view tile may be digitally constructed using a plurality of layers with at least one image layer (e.g., a top image layer) having an image or graphic included therein and one or more transparent segments exposing background color layers below the top image layer. For example, a view tile may include a partially transparent top layer overlaid on one or more color background layers. In some examples, the background color layers do not include images or graphics but instead are a solid pane, window, layer, or the like, of uniform color. As a result, the view tile may be easily constructed from a handful of image/color layers or image/color panes. In some embodiments, only the top layer contains an image/graphic, but lower layers may also include images/graphics. The image layer may include a graphic or design that is created from a designer, for example, via Adobe Photoshop, and the like. Meanwhile, the background layers below composed of solid panes of color, may be constructed using HyperText Markup Language (HTML) tags with Cascading Style Sheet (CSS) styling classes which can be done by a developer or user without any graphical skills.

Furthermore, the view tile may provide a viewer with substantive information with just a quick glance at the view tile without the viewer having to pause and perform in depth analysis such as reading words and sentences or viewing charts and graphs. The top layer of a view tile may include a catchy graphic, phrase, image, and the like, and a handful of (e.g., four or five) background color panes (or layers) may provide background color to the transparent segments of the top layer to generate a value or range of values which are recognizable by a quick glance of a viewer at the view tile.

In one example embodiment, a plurality of view tiles may be included in a dashboard used by a salesperson in a store. For example, while in the store the salesperson may advise a customer individually by use of a tablet, computer, mobile device, kiosk, or the like. The salesperson may pull up a web page on a mobile device including a dashboard with a plurality of fast view tiles associated with the customer's purchasing history, personal information, and the like. For example, the plurality of view tiles may provide information associated with the individual customer such as total sales volume of the customer over time, most recent purchase information of the customer, and the like. Usually the salesperson is having a conversation with the customer and has no time to deal intensively with web content being displayed on a screen. According to various embodiments, the salesperson may be provided with customer information, for example, while a customer is standing in front of them, without requiring the salesperson to stop and read detailed information about the customer off of a screen thus allowing the salesperson to maintain continuous or almost continuous attention to the customer. As a result, the salesperson may continue a conversation without a pause or interruption thereby improving a customer experience while at the same time benefiting from additional information about the customer provided by the fast view tiles.

A view tile may be composed of a simple and clean design. Each tile may include segmented, partly transparent images or graphics thereby providing intricate graphics within the view tile (e.g., shadow effects) while loading only one total resulting image per tile thereby saving on loading space. In addition, the segmented, partly transparent tiles may maintain background colors without the use of image editing software, and without the hassle of having to create many different graphics for the tile. In one example embodiment, the background colors of the segmented graphics may be maintained using Cascading Style Sheets (CSS) styling within a HyperText Markup Language (HTML) structure.

FIG. 1A illustrates a view tile 100 in accordance with an example embodiment, and FIG. 1B illustrates a plurality of layers that constitute the view tile 100 shown in FIG. 1A, in accordance with an example embodiment. Referring to FIG. 1A, the view tile 100 represents a historical sales volume of a customer (i.e., total sales) in US dollar amount. In order to provide a quick view of a total sales volume of a customer, the view tile 100 may be split into four spending levels which are initially represented by transparent segments (104a, 104b, 104c, and 104d) of top image layer 104. By lighting with color or activating one or more of the transparent segments a value or a range of values for the total sales volume may be identified. In this example, four spending levels are as follows:

Level 1 (104a)=$1 to $500
Level 2 (104b)=$501 to $1,000
Level 3 (104c)=$1,001 to $5,000
Level 4 (104d)=above $5,000

Figure 3:
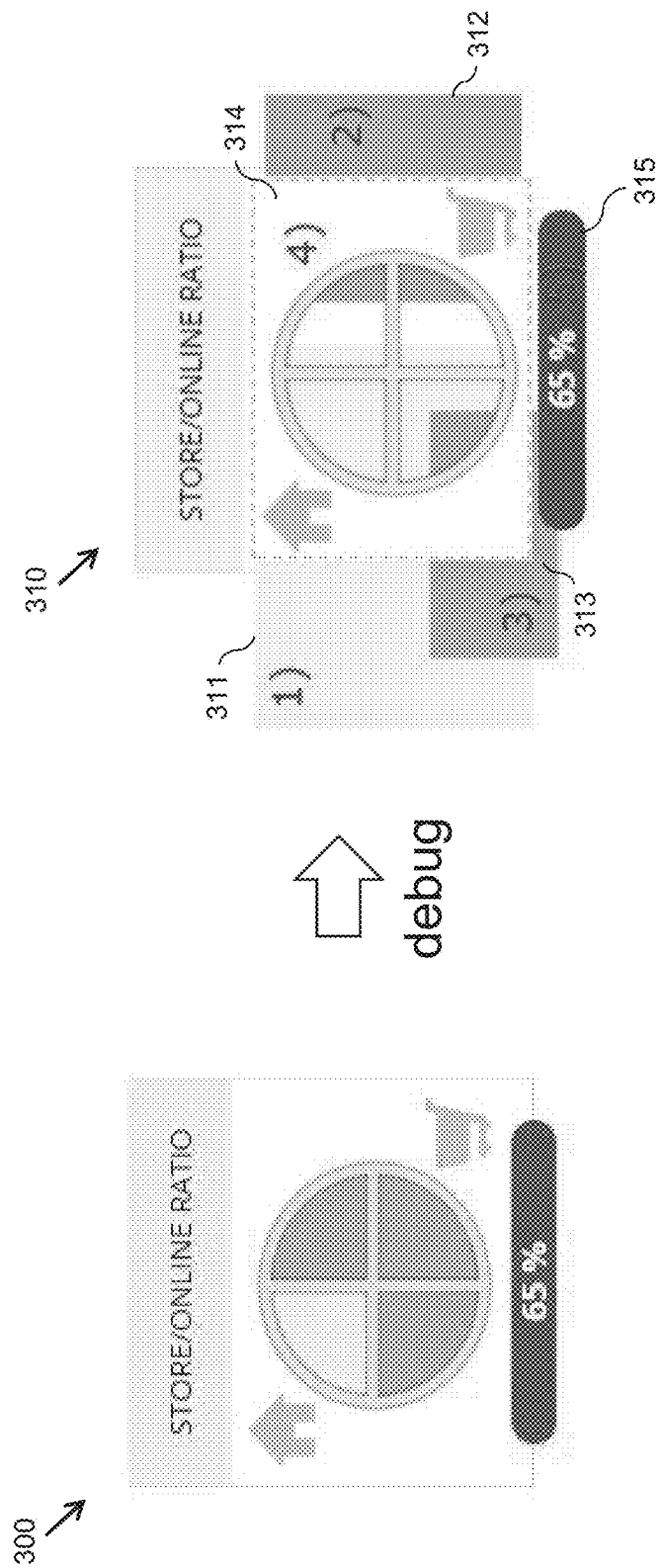
FIG. 3 is a diagram illustrating a process of combining a top image layer and a plurality of background color layers to generate a view tile in accordance with an example embodiment.

The transparent segments may be included in a top image layer 104 of view tile 100 (an example of which is described in FIG. 3). In the example of FIG. 1B, each transparent segment has the shape of a bar and a size of the bars increases from a leftmost bar to a rightmost bar making it easier for the user to view. Here, the first segment 104a and the second segment 104b are filled with background color using one green background color layer 103 (also referred to as color panes) which are shown in FIG. 1B. It is possible to use more than one green background color pane (e.g., two, three, etc.) but it is easier to use only one which is advantageous to a developer. Furthermore, the developer does not need to generate a perfect fit for the green background color layer 103 because the top image layer 104 overlaps and prevents the green background color layer 103 from being visible except for in the transparent segments of the top image layer 104. Furthermore, when a segment is lit up by the color (e.g., green) it may include an accumulation of values represented by a previous segment being lit up. For example, the second segment 104b represents a sales volume between $501-$1000 which also includes an accumulation of the first segment 104a which represents a sales volume between $1 to $500. Accordingly, the transparent segments (or parts of the transparent segments) may be filled in with color to indicate an accumulation of at least two ranges of values from among a plurality of possible ranges of values.

In this example, the total sales volume of the customer is $895 which is represented by segment two 104b among the four transparent segments when filled in with color and consumes segment one 104a. Accordingly, transparent segments 104a and 104b representing the first range of values and the second range of values from among the four ranges of values are activated by coloring the segments with a bright green color. By using only an handful of values or ranges of values such as four ranges of values, a viewer can quickly glance at the view tile 100 and easily discern which of the four ranges of values are colored bright green thereby enabling the view to quickly detect how much money that customer has spent at the store. Furthermore, the viewer does not need to analyze written digital text (or perform an addition process of previous sales) to determine that the customer has spent between $501 and $1000 in total sales volume.

The view tile 100 also includes an optional price layer 105 which illustrates a numeric value representing a price for total sales volume. The optional price layer 105 may be helpful, however, the use of the bar graph may enable a viewer to intuitively realize that the view tile 100 represents total sales volume. Furthermore, by comparing how many of the total bars are lit up, a viewer is able to quickly determine that this customer has a total sales volume that is average (i.e., level two out of four possible levels) which is a feature that may not be readily apparent from a total sales volume of $895 alone. As a result, additional information besides just total sales volume can be gathered by a quick glance of the salesperson based on the graphics and colors in the view tile 100.

The view tile 100 may be composed of or constituted by an image layer and one or more color layers (also referred to as colored panes, background color layers, and the like). As shown in FIG. 1B, a plurality of layers 101, 102, 103, 104, and 105 may be overlayed in that order with respect to each other to generate the fast view tile 100. In this example, there is a bottom tile layer 101, a gray background color tile 102, a green background color tile 103, a top image layer 104 with transparent segments and an image graphic, and an optional price layer 105, however, any other number of image layers may be used, for example, two layers, three layers, four layers, or five or more layers. In addition, this example only includes transparent segments in the top image layer 104, but it should be appreciated that other layers may include transparent segments within a fast view tile.

Referring to FIG. 1B, the background tile layer 101 includes a sales volume text. Next, is the gray background layer 102, the green background layer 103, and the partly transparent top image layer 104 which includes four transparent segments 104a, 104b, 104c, and 104d. Each of the transparent segments in the top image layer 104 are capable of being colored or otherwise filled in by one or more background colors. Here, the bottomo tile is the sales volume tile 101 and the gray background pane 102 is the second bottommost layer included in the fast view tile 100 and is of a big enough size to be positioned behind all of the transparent segments 104a-104d of the top image layer 104. Therefore, initially all four transparent segments 104a-104d may be filled in by the gray color of the gray background pane 102. Furthermore, one green rectangular color pane 103 is used to fill in the background of the first transparent segment 104a and the second transparent segment 104b, respectively, of the top image layer 104 to represent a value for level one and level two of the sales volume. The green background pane 103 is overlayed with respect to the gray background pane 102 causing green to be shown instead of gray. Furthermore, the top image layer 104 is overlayed on top of the green background pane 103 and the gray background pane 102. Furthermore, a dollar amount tile 105 may be added such that it partially overlaps the top image layer 104.

In this example, the tiles from upper row from left to right are generated as follows, tile 101 is built with HTML tags and CSS styling, price tile 105 is built with HTML tags and CSS style, gray background pane 102 is built with HTML tags and CSS styling, green color background pane 103 is built with HTML and CSS styling, and the top image layer 104 is built with HTML, CSS, and one image that is partly transparent with four transparent segments. The image includes a graphic surrounding the exterior edge of the transparent segments and may be designed using a program such as Photoshop, or the like. According to various embodiments, the view tile 100 shown in FIGS. 1A and 1B, may be generated by a computing device, for example, a server, a computer, a desktop, a laptop, a tablet, a mobile phone, a notepad, a kiosk, an appliance, a television, and the like. In one example embodiment, the view tile 100 is generated by a back-end server and output to a user device over a network where it is displayed. In this example, the view tile 100 may be generated by the server but displayed by the user device, and the view tile may be transmitted across a network such as the Internet between the back-end server and the user device, however, the example embodiments are not limited thereto. As another example, the view tile 100 may be generated and displayed by the user device without a back-end server.

Figure 2:
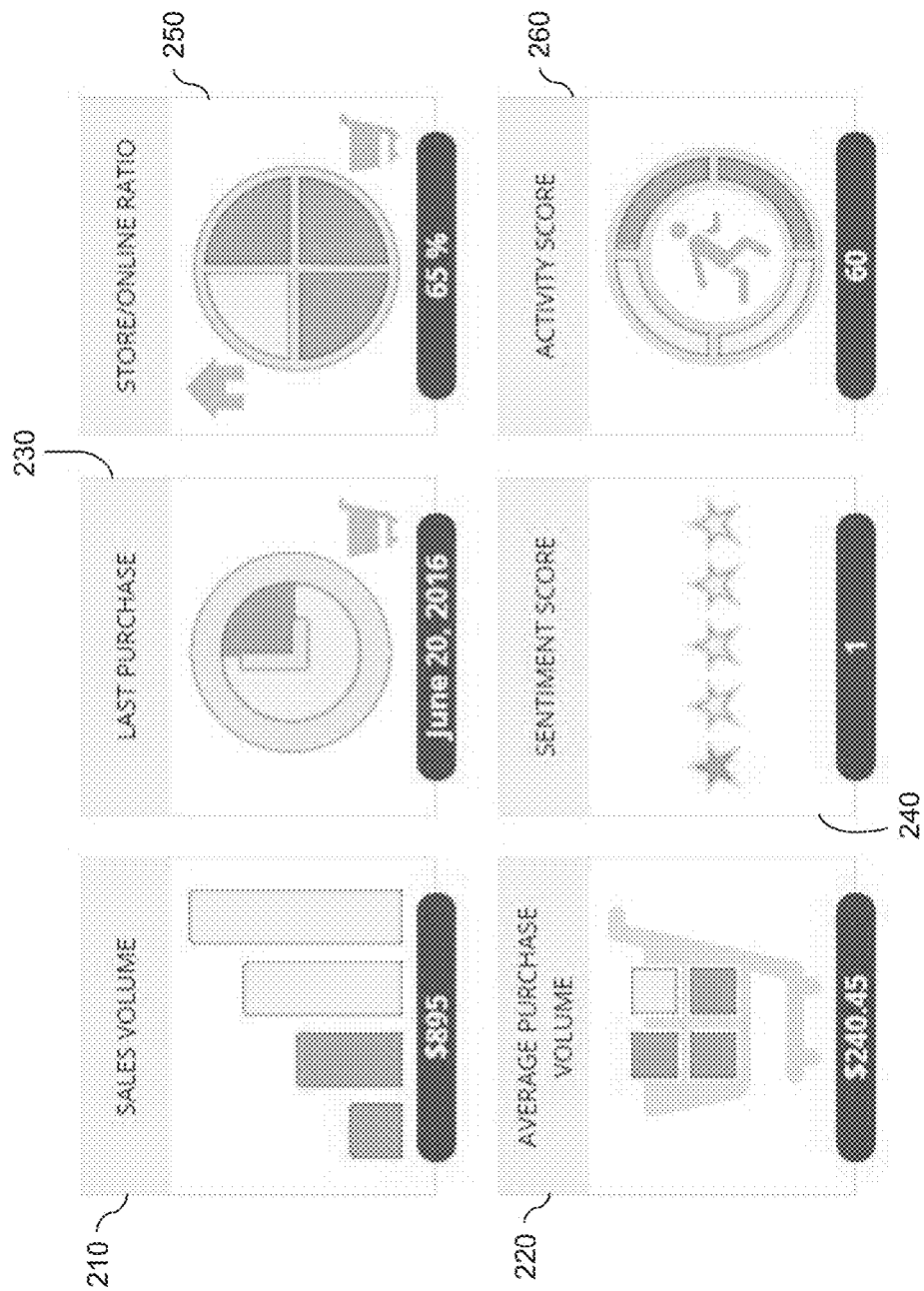
FIG. 2 is a diagram illustrating a plurality of view tiles being simultaneously provided in accordance with an example embodiment.

FIG. 2 illustrates a plurality of fast view tiles being simultaneously provided in accordance with an example embodiment. For example, the plurality of fast view tiles may be included within a user interface (UI) such as a dashboard or other type of display. Each of the tiles may be generated using a respective top image layer having graphics and an outline of a group of transparent segments. For example, each top image layer may include a plurality of transparent segments or shapes there within while providing a graphic or an outline surrounding the transparent segments such as a pie chart, shopping cart, star rating, circle graph, and the like. One or more colored background panes or layers may be used to fill in transparent segments of a top image layer. For example, a top image layer may be combined with a background color pane by overlaying the top image layer on top of the background color pane. Also, one or more of the background color panes may be overlaid with respect to each other such that they overlap.

Referring to FIG. 2, view tile 210 represents a historical sales volume of a customer and is represented using a bar graph graphic and four transparent segments in a top image layer. Here, each transparent bar among the four bars is used to represent a respective range of values for sales volume from among four possible ranges of values. In this example, color (e.g., fluorescent green) is filled in a background of the first bar (first transparent segment) of the top image layer using a background color layer and which represents a sales volume history including a range of $1 to $500. In addition, color is also filled in a background of the second bar on the graph (the same background color pane or a second background color pane) and is used to indicate that the sales volume includes a range of $501-$1000. In this example, because the third bar is not filled in with color, the viewer quickly knows that the range of values is between the ranges indicated by the second bar and includes the range of values represented by the first bar. Accordingly, a viewer can look at the first view tile 210 and intuitively ascertain that the customer has a historical sales volume that is in a range of $501-$1,000. As a result, without having to read a word, a salesperson may be aware that a customer is a moderate spender which can be helpful for the salesperson to provide the customer with advice on purchases.

As another example, view tile 220 is used to represent an average purchase volume of a customer per purchase. In this example, a top image layer has a graphic outline of a grocery cart with a plurality of transparent blocks (e.g., transparent segments) and one or more background color panes are used to fill in three of the four transparent blocks thereby indicating a range of the $201-$300 of average purchase volume. View tile 230 is used to represent a date of last purchase. In this example, a top image layer includes a graphic outline of a circle graph and at least one background color pane is used to fill in the circle graph in four areas. In this view tile 230, the top image layer includes one transparent segment that is capable of representing a plurality of ranges of values by partially filling in the transparent segment (such as filling in a quarter of the circle, half of the circle, or three-fourths of the circle). That is, a plurality of ranges of values are capable of being generated based on how one transparent segment is filled in. For example, if only one quarter of the transparent circle is filled, a first range of values may be identified by view tile 230, whereas if one half of the transparent circle is filled, a second range of values may be identified by view tile 230 including an accumulation of the first range of values and the second range of values.

View tile 240 is used to indicate a sentiment score and has a top image layer with a graphic outline of a plurality of transparent stars as transparent segments and background color panes may be used to fill in at least one of the transparent stars with color. View tile 250 provides a comparison between online purchases versus in store purchases by the customer with a top image layer including a pie chart graphic with four pieces of pie (transparent segments) which may be filled in with background color panes to indicate a ratio thereof. View tile 260 provides an activity score of a customer with a top image layer having a running graphic with four quarter circle bars capable of being filled in by background color panes.

In these examples, a top image layer of each tile includes at least one transparent segment or sub-area that provides a window for background color to be expressed. Accordingly, a background color included in a background layer or background pane can be arranged behind a respective transparent segment, and the background color may fill in or partially fill in the transparent segment with color. In addition, each of these tiles may also include a value layer (in dark blue) representing an exact numerical value of the information about the customer. As a result, the salesperson can view a value of the customer with respect to other customers (e.g. a range) and also an exact value for the customer (e.g., numerical value).

In this example, more than thirty single graphics were needed to create all six of the view tiles:

| | | |
|---|---|---|
| Sales Volume tile: | 1x Level 0 in gray + 4x Level 1, 2, 3, 4 in green = | 5 |
| Average Purchase tile: | 1x Level 0 in gray + 4x Level 1, 2, 3, 4 in green = | 5 |
| Last Purchase tile: | 1x Level 0 in gray + 4x Level 1, 2, 3, 4 in green = | 5 |
| Sentiment Score tile: | 1x Level 0 in gray + 5x Level 1, 2, 3, 4, 5 in green = | 6 |
| Store/Online Ratio tile: | 1x Level 0 in gray + 4x Level 1, 2, 3, 4 in green = | 5 |
| Activity Score tile: | 1x Level 0 in gray + 4x Level 1, 2, 3, 4 in green = | 5 |
| | | Total: 31 |

By using segmented, and partially transparent images, only a handful of graphics are needed for each tile. Furthermore, a representation of the level of color values (e.g., green and gray) may be made possible, for example, using several <div> tags with CSS styling for the colors within an HTML structure or code.

FIG. 3 illustrates a process of combining a top image layer 314, three color background layers 311, 312, and 313, and one optional layer 315 for price information to generate a view tile 300 in accordance with an example embodiment. In this example, five layers are combined to make view tile 300. Referring to FIG. 3, view tile 300 includes a deconstructed or debugged representation 310 illustrating the plurality of layers. In this case, the layers are numbered one through five, with five being the uppermost layer and one being the lowermost layer when the layers are combined. Gray background pane 311 is used to provide a gray background layer for the entire view tile 300. On top of gray background pane 311 is top image layer 314 providing a substantive range of values indicating a customer's in-store versus online purchase ratio. In this example, the top image layer 314 includes a pie chart graphic image having an outline of four possible ranges of values (0-25%, 25-50%, 50-75%, and 75-100%) represented by four transparent segments which are each shaped in the form of a quarter circle or a piece of pie.

If the store-to-online purchase ratio where to have a value of 0%, in other words, if no color was needed to fill in the background of the transparent pie chart, the gray background pane 311 would fill in the entire pie chart of the top image layer 314 with gray color. However, in this example, three of the four transparent segments of the pie chart are filled with a green color to represent that the customer has a store-to-online purchase ratio that is between 50-75%. In this example, two green background panes 312 and 313 are used to fill in three of the transparent segments of the top image layer 314. It should be appreciated that this is merely exemplary, and a different number of background color panes may be used to fill in transparent segments. As a result of the two green background panes 312 and 313, three of the transparent segments of the top layer 314 are filled in with green color while the other transparent segment of the top layer 314 remains filled in with gray color from the gray colored background pane 311.

A background color pane used to fill in a transparent segment may be any color. For example, the background pane may be uniformly filled with white, black, grey, red, green, blue, yellow, orange, brown, and/or any other color. The background color layers may be generated using CSS styling and HTML tags. Also, the top image layer may have a color that is different from a color of the background pane such that a viewer (or user) can easily discern between a transparent segment that has been filled in with color and a border of the top image layer surrounding the filled-in transparent segment. Also, a color of the top image layer and a color of the background pane may be easily discernible from transparent segments which have no color. As a result, a viewer can easily discern between a graphic of the top image layer surrounding or bordering a transparent segment there within and an interior of the transparent segment. Also, a viewer can easily discern between a portion of the top image layer surrounding a transparent segment that is to be filled in by the colored background pane. Accordingly, a viewer can easily determine how many transparent segments have been filled in with color, and how many possible segments can be filled in, by just a quick glance at the display screen.

Referring again to FIG. 3, the green background panes 312 and 313 overlap the gray background pane 311. In this case, the green background panes 312 and 313 are shown without any change in color even though they overlap with the gray background pane 311. In other words, the green color is not shaded by the gray background color. However, in other examples, the two colors may be combined to create a shaded coloring. Furthermore, transparent segments filled in by a dominant background color or a bright background color may be used to indicate a value for the view tile while transparent segments filled in with a lighter background color or a softer color may not be used to calculate a value for the view tile. In the example of FIG. 3, the portion of the pie chart of the top image layer 314 that is filled in with a gray background color is not used when determining a value or a range of values from the view tile 310. In addition, a fifth layer 315 is used to provide an exact numerical value. In this case, the exact value included in the fifth layer 315 is displayed such that it is easily and quickly identifiable.

In this example, only five layers are needed to generate the view tile 300. Provided below is a semantic example of the view tile 300 shown in FIG. 3.

<div> layer 311 with CSS class 1): Background color gray for level 0
<div> layer 312 with CSS class 2): Background color green for level 1 to 2
<div> layer 313 with CSS class 3): Background color green for level 3 to 4
<div> layer 314 with CSS class 4): Segmented, partly transparent graphic
<div> layer 315 with CSS class 5): Optional, layer for a value or amount Provided below is a sample HTML structure that may be used to generate the view tile 300 shown in FIG. 3

```
<div class= "asm-tile asm-pointer">
    <div class= "asm-tile-title">Store Purchase Ratio</div>
```

-continued

```
<div class= "asm-tile-container">
    <div class= "asm-tile-bg"></div> 1)
    <div class= "asm-tile-store-pur-rate-1"></div> 2)
    <div class= "asm-tile-store-pur-rate-2"></div> 3)
    <div class= "asm-tile-img"><img /></div> 4)
    <div class= "asm-tile-bottom">         5)
        <div class= "asm-tile-bottom-value">99 %</div>
    </div>
</div>
</div>
```

For example, using simple CSS style classes for positioning of colored rectangles in the background layers, and HTML structures, it is possible to simulate different levels with only one overlaying partly transparent graphic top layer. But the use of HTML structure and CSS style classes is only a sample. It is also possible to use other technics to generate the same result, for example, using <span> tags instead of <div> tags or using a scalable vector graphics (SVG) technic instead of simple CSS classes to provide the background shapes, for example, for a green three quarters of a circle layer.

Figure 4:
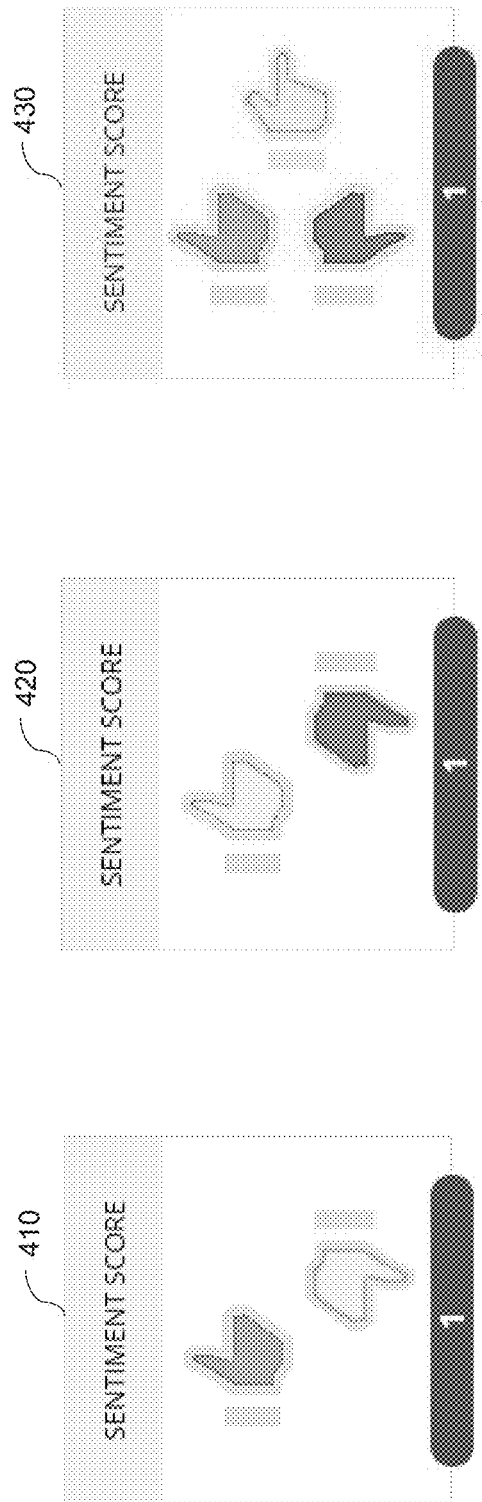
FIG. 4 is a diagram illustrating a plurality of multicolor view tiles in accordance with an example embodiment.

By using segmented, partly transparent layers it is also possible to provide fast view tiles with two or more different colors. FIG. 4 illustrates a plurality of multicolor fast view tiles in accordance with an example embodiment. Referring to FIG. 4, a first tile 410 and a second tile 420 include a value represented by both a transparent segment being filled in along with a background color of the transparent segment. In the first tile 410, the background color green in the thumbs up transparent segment is used to indicate OK or GOOD while the background color red in the thumbs-down transparent segment is used to indicate STOP or BAD. As yet another multicolor example, third tile 430 includes three hand signals with the intermediate hand signal colored yellow representing MAYBE or CAUTION.

Figure 5:
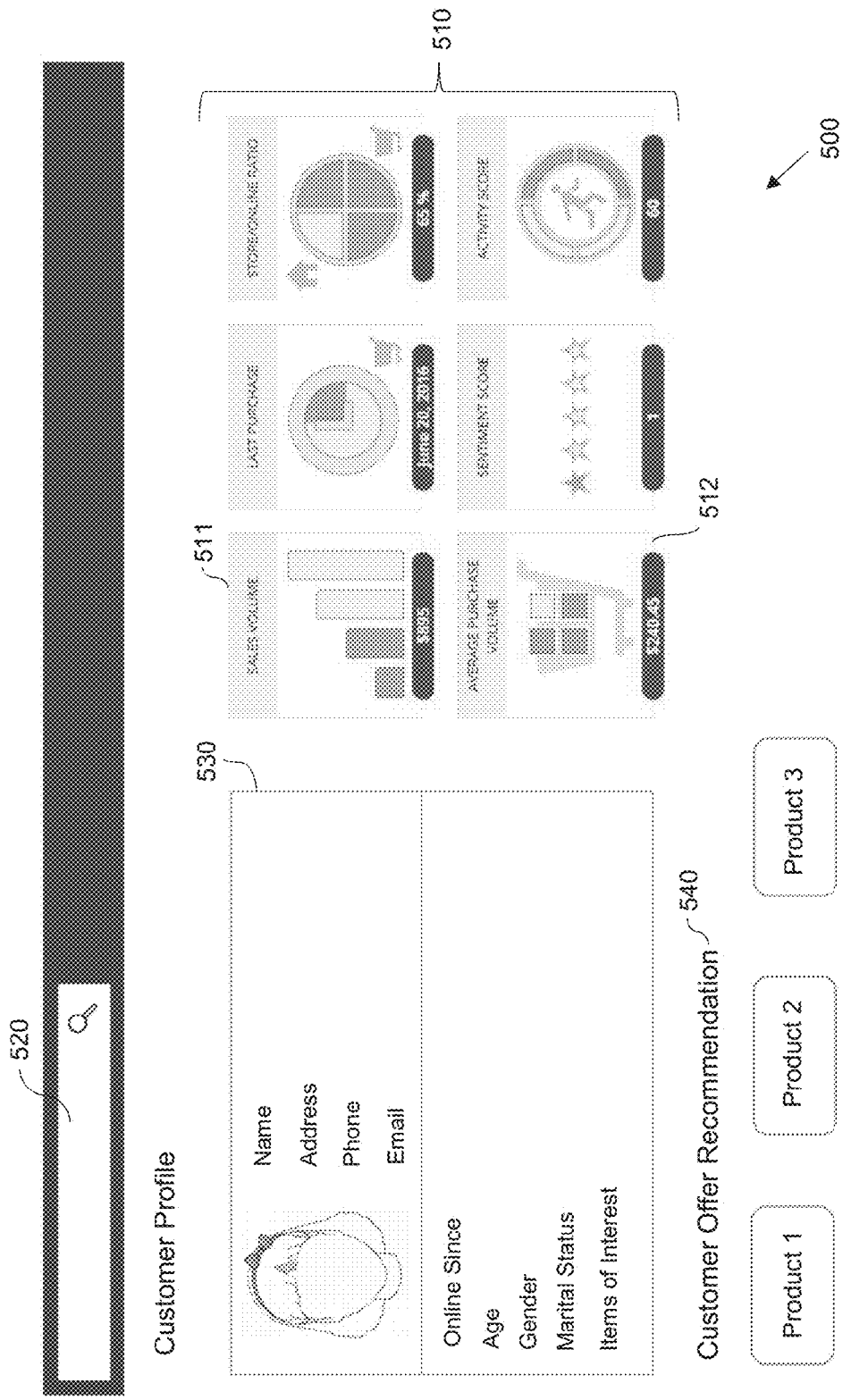
FIG. 5 is a diagram illustrating a dashboard interface including a plurality of view tiles in accordance with an example embodiment.

FIG. 5 illustrates a dashboard interface 500 including a plurality of fast view tiles in accordance with an example embodiment. Referring to FIG. 5, the dashboard interface 500 includes a comprehensive overview of a customer at a glance based on a plurality of fast view tiles 510 as well as other information that may be viewed if the salesperson desires. The dashboard interface 500 also provides a search bar 520 which may allow a salesperson to input terms and search for customers, products, and the like. The dashboard interface 500 also includes a customer profile 530 that provides additional information about a customer (e.g., name, address, phone, email, age, gender, interests, family size, etc.) as well as recommended offers 540.

In this example, the plurality of fast view tiles 510 provide various information about a customer to a salesperson without requiring the salesperson to read information. For example, simply by looking at bar chart view tile 511, a salesperson may intuitively recognize that the bar chart tile 511 corresponds to total sales volume without needing anything else. Also, the salesperson may quickly recognize the amount of total sales volume based on how many transparent segments are filled in with a background color. As another example, simply by looking at grocery cart view tile 512 including the grocery cart graphic the salesperson may intuitively recognize that the grocery cart view tile 512 corresponds to average purchase price, and may quickly recognize the customer's average purchase price based on how many of the transparent blocks in the grocery cart are filled in with color.

Figure 6:
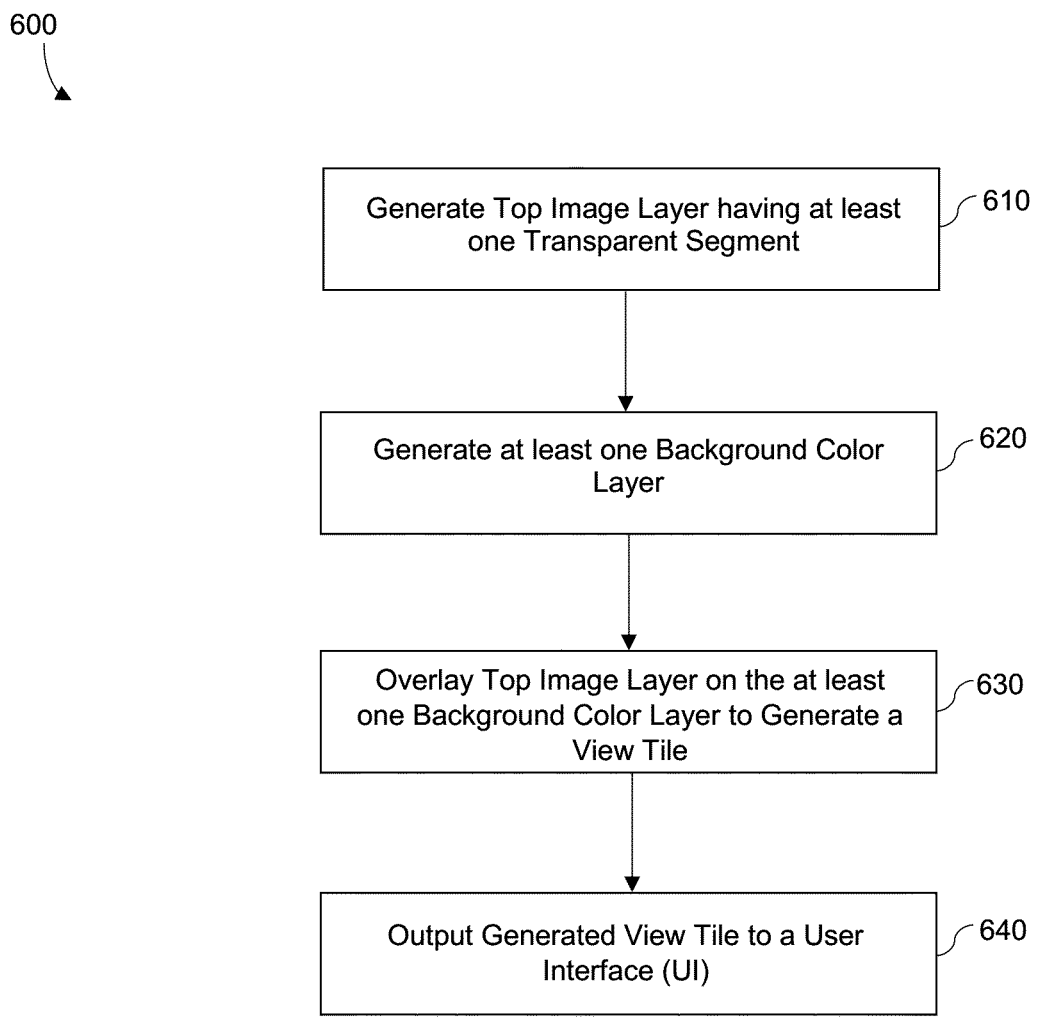
FIG. 6 is a diagram illustrating a method for generating a view tile in accordance with an example embodiment.

FIG. 6 illustrates a method 600 for generating a view tile in accordance with an example embodiment. Referring to FIG. 6, in 610 the method includes generating a top image layer for the view tile including at least one transparent segment (or sub-segment) within the top image layer. For example, the top image layer may include a plurality of transparent segments which are capable of representing a plurality of values based on which of the plurality of transparent segments are filled in with a background color (e.g., blue, orange, green, yellow, red, etc.). For example, the plurality of values may include a plurality of ranges of values, and the view tile may represent at least one range of values from among the plurality of ranges of values or it may represent an accumulation of multiple ranges of values from the plurality of ranges of values. The top image layer may also include one or more graphics, banners, colors, text, images, and the like, which are displayed around the at least one transparent segment. In 620, the method includes generating a background color layer comprising a desired color. The background color layer may be shaped like a square, a rectangle, a pentagon, a circle, a triangle, or some other shape such as a plus sign, a bar, or the like. The background color layer may have a size that is equal to the size of the view tile or it may be smaller than the size of the view tile. Furthermore, more than one background color layer may be generated to fill in the background of the at least one transparent segment of the top image layer.

In 630, the method includes laying the top image layer on the background color layer to generate a view tile representing a value from among the plurality of values, and in 640, the generated view tile is displayed. For example, the laying (or overlaying) may include arranging the background color layer at a position in a background of the at least one transparent segment of the top image layer causing the at least one transparent segment to be filled with the color. That is, the background color layer may be positioned to correspond to a position of one or more transparent segments of the top image layer. In some examples, the overlaying may include arranging the background color layer in the background of at least two transparent segments of the top image layer causing the at least two transparent segments to be filled in with the color by the background color layer. As another example, one of the multiple background color layers may include a second color that is different than the color used to calculate the value represented by the view tile. For example, the value of the color used to calculate a value of the view tile may be a bright or dominating color such as green, red, blue, yellow, and the like, while a background color not used to calculate the value may be a softer color such as white, grey, cream, and the like.

According to various embodiments, the top image layer and the background color layer may be generated and arranged based on at least one Cascading Style Sheet (CSS) class and at least one HypertText Markup Language (HTML) structure such as described in the example of FIG. 3. For example, the CSS style and the HTML structure may be used to design a shape of the top image layer and the background color layer and also to generate color, style, size, and the like, of the image and color layers. In some examples, the top image layer encompasses all of the view tile while each of or at least one of the background color layers only encompasses a portion of the view tile but not all of the view tile.

Figure 7:
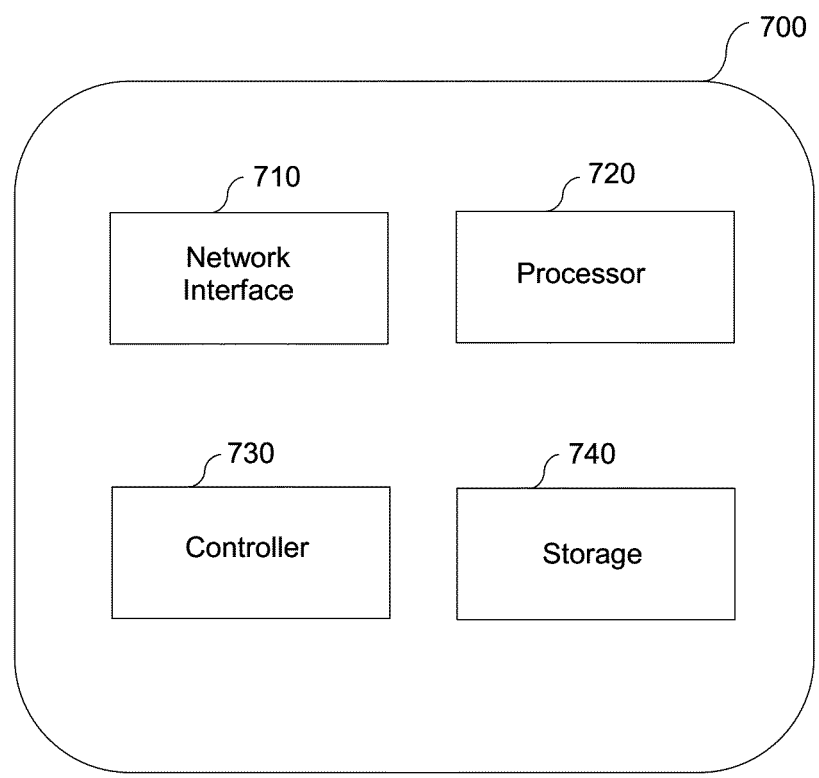
FIG. 7 is a diagram illustrating a device for generating a view tile in accordance with an example embodiment.

FIG. 7 illustrates a computing device 700 for generating a view tile in accordance with an example embodiment. For example, the computing device 700 may be a server (e.g., a web server), a user device such as a tablet, computer, mobile phone, and the like, or it may be another type of device. The computing device 700 may generate a fast view tile and may perform the method of FIG. 6. Referring to FIG. 7, the computing device 700 includes a network interface 710, a processor 720, a controller 730, a storage 740, and an output 750. Although not shown in FIG. 7, the computing device 700 may include other features, for example, an input unit, a transmitter, a receiver, a display, and the like. The network interface 710 may transmit and receive data over a network such as the Internet. The processor 720 may include a single core processing device, a multicore processing device, or multiple processing devices. The processor 720 may control the overall operations of the computing device 700. Although shown as a separate component, function of the controller 730 may be performed by the processor 720. As another example, the controller 730 may include a graphics processing unit (GPU), a video controller, an image generator, and the like. The storage 740 may include any desired memory, for example, random access memory (RAM), one or more hard disks, cache, hybrid memory, an external memory, flash memory, and the like.

According to various aspects, the processor 720 may generate a top image layer including a plurality of transparent segments that are capable of representing a plurality of values based on which of the plurality of transparent segments become filled in with a color by a background color layer. In some cases, the plurality of values may include a plurality of ranges of values, and the view tile may represent at least one range of values or an accumulation of ranges of values from among the plurality of ranges of values. In addition, the processor 720 may generate at least one background color layer to be used to fill in color in one or more transparent segments of the top image layer. For example, the processor 720 may generate the top image layer and the at least one background color layer based on at least one Cascading Style Sheet (CSS) class and at least one HyperText Markup Language (HTML) structure. A size, style, format, graphic, color, arrangement, and the like, of each of the top image layer and the one or more background color layers may defined based on the CSS class and the HTML structure. For example, the top image layer may have a size that is equal to a size of the view tile while the background color layer may be smaller in size and only encompass a portion of the view tile.

The controller 730 may combine the top image layer and the background color layers. For example, the controller 730 may overlay the top image layer onto at least one background color layer to generate a view tile representing a value or an accumulation of values from among the plurality of values. Here, the controller 730 may arrange the background color layer in a background of at least one transparent segment of the top image layer causing the at least one transparent segment to be filled with the color. The network interface 710 may output, transmit, send, or otherwise provide the generated view tile representing the value from among the plurality of values to a user device such as a mobile device, a desktop computer, a laptop, a tablet, a kiosk, an appliance, and the like. According to some embodiments, the controller 730 may arrange the background color layer in the background of at least two of the transparent segments causing the at least two transparent segments to be filled in with the color by the background color layer. As another example, the processor 720 may generate two background color layers and the controller 730 may use the two background color layers to fill in two transparent segments, respectively. In this example, one or more of the at least two background color layers may include a second color that is different than the color, and the transparent segment filled in with the second color may not used to calculate the value represented by the view tile.

The example embodiments are directed towards a user interface that includes at least one fast view tile. Each tile may provide a quick insight or overview of information about an item such as a customer, person, thing, product, or the like. Furthermore, a plurality of quick view tiles may be used to provide a wider array of information quickly. Each tile may be constructed of a plurality of layers with at least one partially transparent layer being laid over the other layers which are uniform or partially uniform in a solid color. A fast view tile may display a handful of levels or ranges of values using a handful of transparent segments/sub-segments as well as a graphic or design. As a result, a fast view tile may provide a quick overview of an item at a glance without requiring the viewer to read information in detail allowing the viewer to continue performing other activities such as talking with a customer or viewing a computer.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing device comprising:
a processor configured to
generate a top image layer comprising an opaque section and a plurality of transparent segments corresponding to a plurality of values based on which of the plurality of transparent segments are filled in with color, wherein each transparent segment is associated with multiple Cascading Style Sheet (CSS) style classes corresponding to multiple levels to display,
generate at least one background color pane comprising color,
receive a value from among the plurality of values,
determine a level from among the multiple levels to display, based on the received value,
determine, for each transparent segment, which CSS style class to implement from among the multiple CSS style classes associated with each segment, based on the determined level, and
generate an Hypertext Markup Language (HTML) structure including the determined CSS style classes for the plurality of transparent segments determined based on the determined level; and
a controller configured to overlay the top image layer on the at least one background color pane to generate a view tile and arrange the at least one background color pane in a background of at least one transparent segment of the top image layer based on the HTML structure causing the at least one transparent segment to be filled with the color based on the determined level,
wherein the processor is further configured to output the generated view tile representing the value to a user interface of a display device.

2. The computing device of claim 1, wherein the controller is configured to arrange the at least one background color pane such that at least one transparent segment of the top image layer is not filled in with color.

3. The computing device of claim 1, wherein the controller is configured to arrange the at least one background color pane in the background of at least two of the transparent segments of the top image layer which are separated by the opaque section of the top image layer causing the at least two separated transparent segments to be filled in with the color by the at least one background color pane.

4. The computing device of claim 1, wherein the processor is further configured to generate two background color panes which are used to fill in two transparent segments, respectively.

5. The computing device of claim 4, wherein one of the two background color panes comprises a second color that is different than the color, and the transparent segment filled in with the second color pane is not used to calculate the value represented by the view tile.

6. The computing device of claim 1, wherein the processor generates the top image layer and the at least one background color pane based on a plurality of instances of an HTML tag combined with one or more respective CSS style classes within the HTML structure.

7. The computing device of claim 1, wherein the top image layer encompasses all of the view tile and the at least one background color pane only encompasses a portion of the view tile but not all of the view tile.

8. The computing device of claim 1, wherein the plurality of values comprise a plurality of ranges of values, and the view tile represents at least one range of values from among the plurality of ranges of values.

9. A method comprising:
generating a top image layer comprising an opaque section and a plurality of transparent segments corresponding to a plurality of values based on which of the plurality of transparent segments are filled in with color, wherein each transparent segment is associated with multiple Cascading Style Sheet (CSS) style classes corresponding to multiple levels to display;
generating at least one background color pane comprising color;
receiving a value from among the plurality of values;
determining a level from among the multiple levels to display, based on the received value,
determining, for each transparent segment, which CSS style class to implement from among the multiple CSS style classes associated with each segment, based on the determined level;
generating an Hypertext Markup Language (HTML) structure including the determined CSS style classes for the plurality of transparent segments determined based on the determined level;
overlaying the top image layer on the at least one background color pane to generate a view tile and arranging the at least one background color pane in a background of at least one transparent segment of the top image layer based on the HTML structure causing the at least one transparent segment to be filled with the color based on the determined level; and
displaying the generated view tile representing the value via a user interface.

10. The method of claim 9, wherein the overlaying comprises arranging the at least one background color pane such that at least one transparent segment of the top image layer is not filled in with color.

11. The method of claim 9, wherein the overlaying comprises arranging the at least one background color pane in the background of at least two of the transparent segments which are separated by the opaque section of the top image layer causing the at least two separated transparent segments to be filled in with the color by the at least one background color pane.

12. The method of claim 9, wherein the at least one background color image pane comprises two background color panes which are used to fill in two transparent segments, respectively.

13. The method of claim 11, wherein one of the two background color panes comprises a second color that is different than the color, and the transparent segment filled in with the second color pane is not used to calculate the value represented by the view tile.

14. The method of claim 9, wherein the top image layer and the at least one background color panes are generated and arranged based on a plurality of instances of an HTML tag combined with one or more respective CSS style classes within the HTML structure.

15. The method of claim 9, wherein the top image layer encompasses all of the view tile and the at least one background color pane only encompasses a portion of the view tile but not all of the view tile.

16. The method of claim 9, wherein the plurality of values comprise a plurality of ranges of values, and the view tile represents at least one range of values from among the plurality of ranges of values.

17. A non-transitory computer readable medium having stored therein instructions that when executed cause a computer to perform a method comprising:

generating a top image layer comprising an opaque section and a plurality of transparent segments corresponding to a plurality of values based on which of the plurality of transparent segments are filled in with color, wherein each transparent segment is associated with multiple Cascading Style Sheet (CSS) style classes corresponding to multiple levels to display;

generating at least one background color pane comprising color;

receiving a value from among the plurality of values;

determining a level from among the multiple levels to display, based on the received value, determining, for each transparent segment, which CSS style class to implement from among the multiple CSS style classes associated with each segment, based on the determined level;

generating an Hypertext Markup Language (HTML) structure including the determined CSS style classes for the plurality of transparent segments determined based on the determined level;

overlaying the top image layer on the at least one background color pane to generate a view tile and arranging the at least one background color pane in a background of at least one transparent segment of the top image layer based on the HTML structure causing the at least one transparent segment to be filled with the color based on the determined level; and displaying the generated view tile representing the value via a user interface.

18. The non-transitory computer-readable medium of claim 17, wherein the overlaying comprises arranging the at least one background color pane in the background of at least two of the transparent segments causing the at least two transparent segments to be filled in with the color by the at least one background color pane.

19. The non-transitory computer-readable medium of claim 17, wherein the top image layer and the at least one background color pane are generated and arranged based on a plurality of instances of an HTML tag combined with one or more respective CSS style classes within the HTML structure.

20. The non-transitory computer-readable medium of claim 17, wherein the top image layer encompasses all of the view tile and the at least one background color pane only encompasses a portion of the view tile but not all of the view tile.

* * * * *